United States Patent [19]
Izumi

[11] Patent Number: 5,703,991
[45] Date of Patent: Dec. 30, 1997

[54] OPTICAL PART MODULE REDUCED IN SIZE AND PRINTED BOARD PACKAGE HAVING SUCH AN OPTICAL PART MODULE

[75] Inventor: Shigeichi Izumi, Kawasaki, Japan

[73] Assignee: Fujitsu Limited, Kanagawa, Japan

[21] Appl. No.: 601,572

[22] Filed: Feb. 14, 1996

[30] Foreign Application Priority Data

Aug. 22, 1995 [JP] Japan .................. 7-213286

[51] Int. Cl.⁶ ............... G02B 6/00; B65H 18/28
[52] U.S. Cl. .............. 385/135; 385/92; 57/62; 242/159; 242/18 R
[58] Field of Search ................ 385/134–137, 385/147, 88, 92; 57/6, 12, 62; 242/18 G, 18 R, 26.4, 26.45, 159

[56] References Cited

U.S. PATENT DOCUMENTS

| | | | |
|---|---|---|---|
| H502 | 8/1988 | Mabee, III | 242/18 R |
| 4,597,255 | 7/1986 | Hunter et al. | 57/62 |
| 4,920,738 | 5/1990 | White et al. | 57/62 |
| 5,022,600 | 6/1991 | Blanc et al. | 242/107.1 |
| 5,125,066 | 6/1992 | Ishiguro et al. | 385/142 |
| 5,181,270 | 1/1993 | Hsu et al. | 385/134 |
| 5,189,724 | 2/1993 | Hartley | 385/135 |
| 5,243,679 | 9/1993 | Sharrow et al. | 385/135 |

FOREIGN PATENT DOCUMENTS

5315767  11/1993  Japan .

*Primary Examiner*—Rodney B. Bovernick
*Assistant Examiner*—Hemang Sanghavi
*Attorney, Agent, or Firm*—Helfgott & Karas, P.C.

[57] ABSTRACT

An optical part module has an optical amplification fiber in a small space without damage or losing its optical characteristics. An optical amplification fiber connects optical parts in the case. The optical amplification fiber has a predetermined length which creates a large play in length. A part of the optical amplification fiber creating the play in length is wound on the bobbin. The winding operation is performed while turning the bobbin upside down for each single turn of the winding so that twist generated in the optical fiber due to winding is canceled.

15 Claims, 13 Drawing Sheets

OPTICAL PART MODULE REDUCED IN SIZE AND PRINTED BOARD PACKAGE HAVING SUCH AN OPTICAL PART MODULE

BACKGROUND OF THE INVENTION

1. Field of the Invention

The present invention generally relates to an optical part module and a printed board package having the optical part module and, more particularly, to an optical part module which constitutes an optical fiber amplifier provided in a repeater for an optical communication system and a printed board package having such an optical part module.

2. Description of the Related Art

Figure 1:
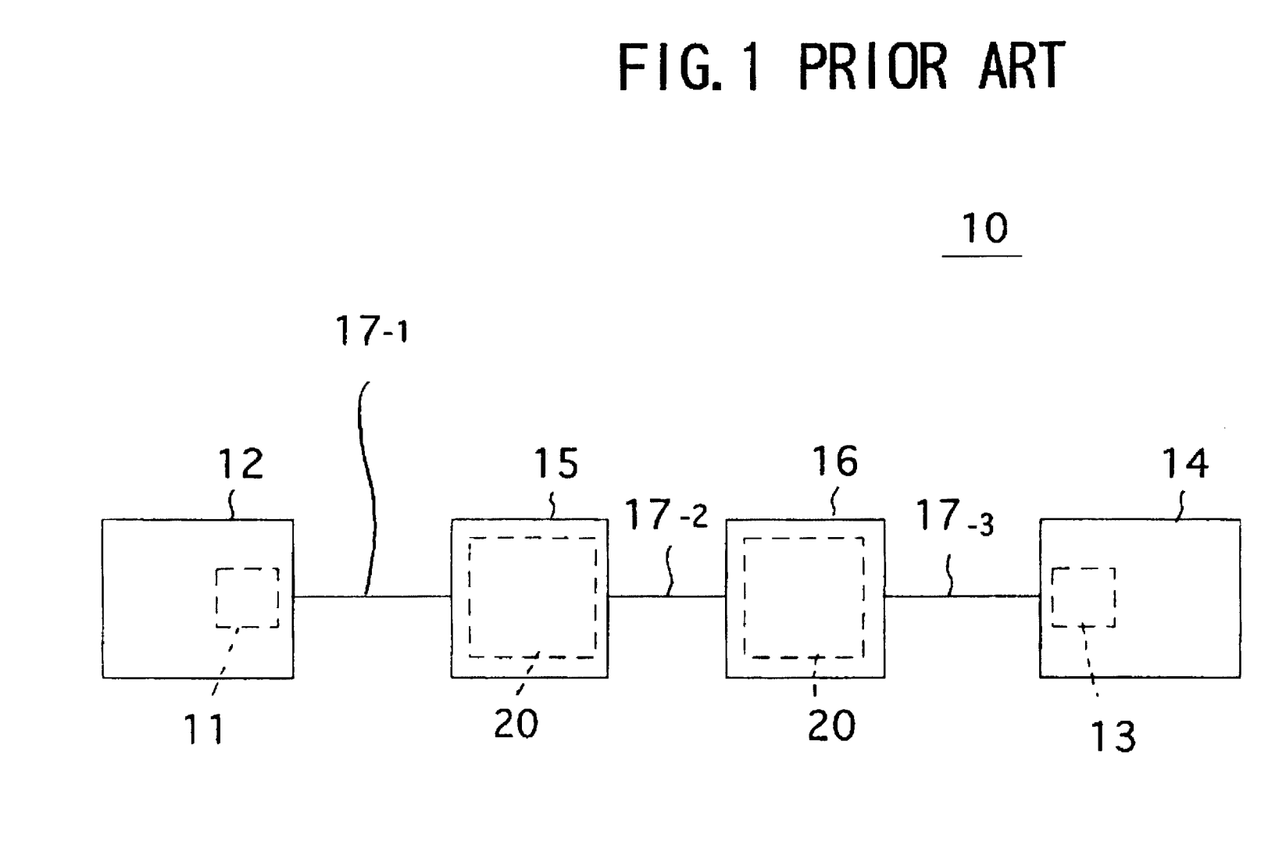
FIG. 1 is a block diagram of an example of an optical communication system.

FIG. 1 shows an example of an optical communication system 10. The optical communication system 10 comprises a transmitter 12 having a light source, repeaters 15 and 16 and a receiver 14 having a photodetector. The transmitter 12, the repeaters 15 and 16 and the receiver 14 are connected via optical fibers 17-1, 17-2 and 17-3, in that order. An optical fiber amplifier 20 is provided in each of the repeaters 15 and 16.

Figure 2:
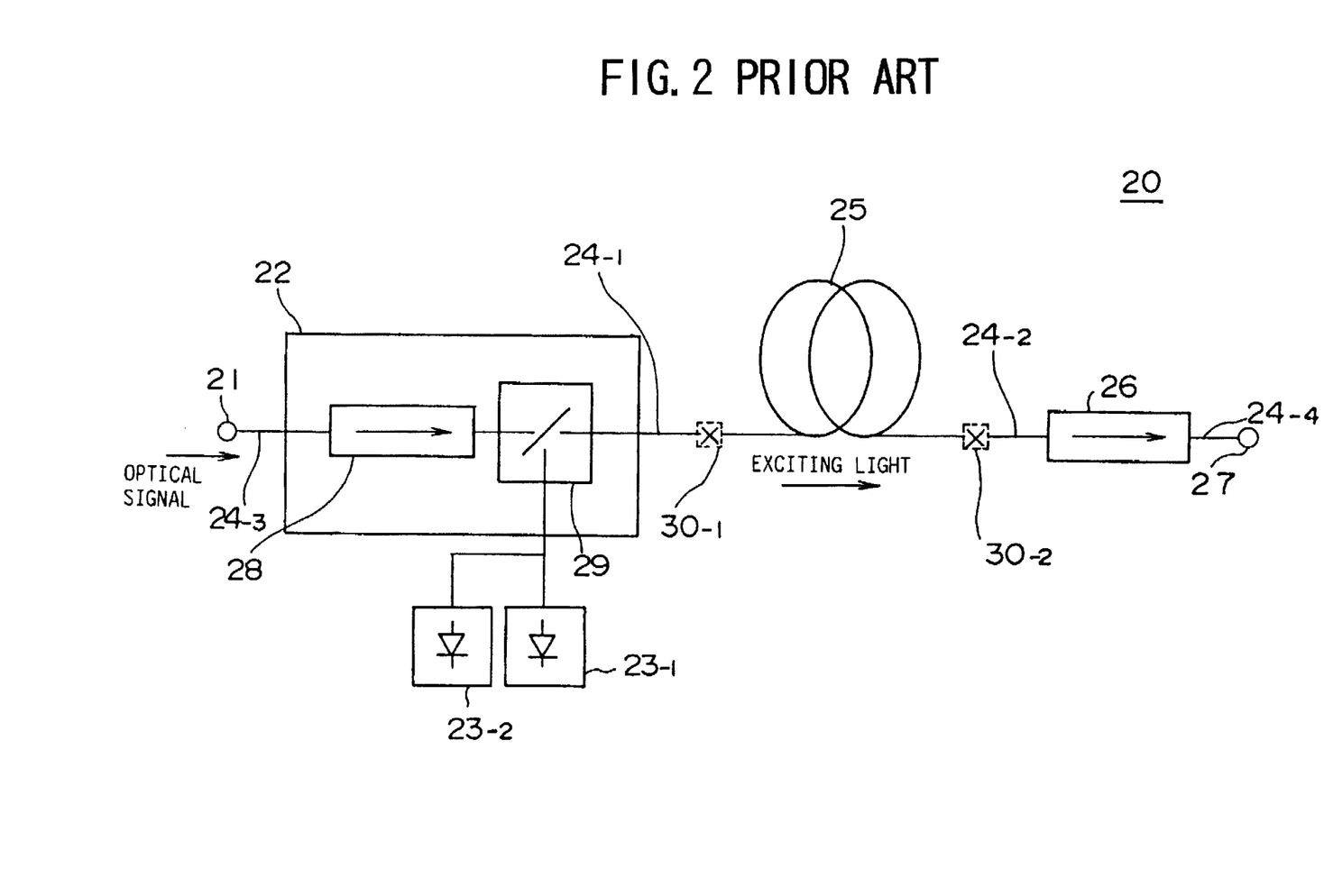
FIG. 2 is a structure of an optical fiber amplifier shown in FIG. 1.

FIG. 2 shows a structure of the optical fiber amplifier 20 shown in FIG. 1. The optical fiber amplifier 20 comprises an optical input terminal 21, a pre-stage module 22, semiconductor lasers 23-1 and 23-2, an optical transmission fiber 24-1, an optical amplification fiber 25, an optical transmission fiber 24-2, an optical isolator 26 and an optical output terminal 27. The semiconductor lasers 23-1 and 23-2 are used as excitation light sources. An optical isolator 28 and an optical synthesizer/splitter 29 are incorporated in the pre-stage module 22.

The optical amplification fiber 25 is doped with erbium. The optical amplification fiber 25 is excited by laser beams emitted by the semiconductor lasers 23-1 and 23-2. An optical signal input from the optical input terminal 21 is amplified when the optical signal transmits through the optical amplification fiber 25.

One end of the optical amplification fiber 25 is connected to the optical fiber 24-1 via a fused splice part 30-1. The other end of the optical amplification fiber is connected to the optical fiber 24-2 via fused splice part 30-2. An optical fiber 24-3 connects the optical input terminal 21 to the pre-stage module 22. An optical fiber 24-4 connects the optical output terminal 27 to the optical isolator 26.

In order to reduce a size of the repeater in optical communication systems such as the optical communication system 10 shown in FIG. 1, it is desirous to reduce the size of the repeater. The size of the repeater can be reduced if the size of the optical fiber amplifier 20 is reduced. In order to reduce the size of the optical fiber amplifier, a printed board package provided in the optical fiber amplifier 20 is needed to be miniaturized.

Figure 3A:
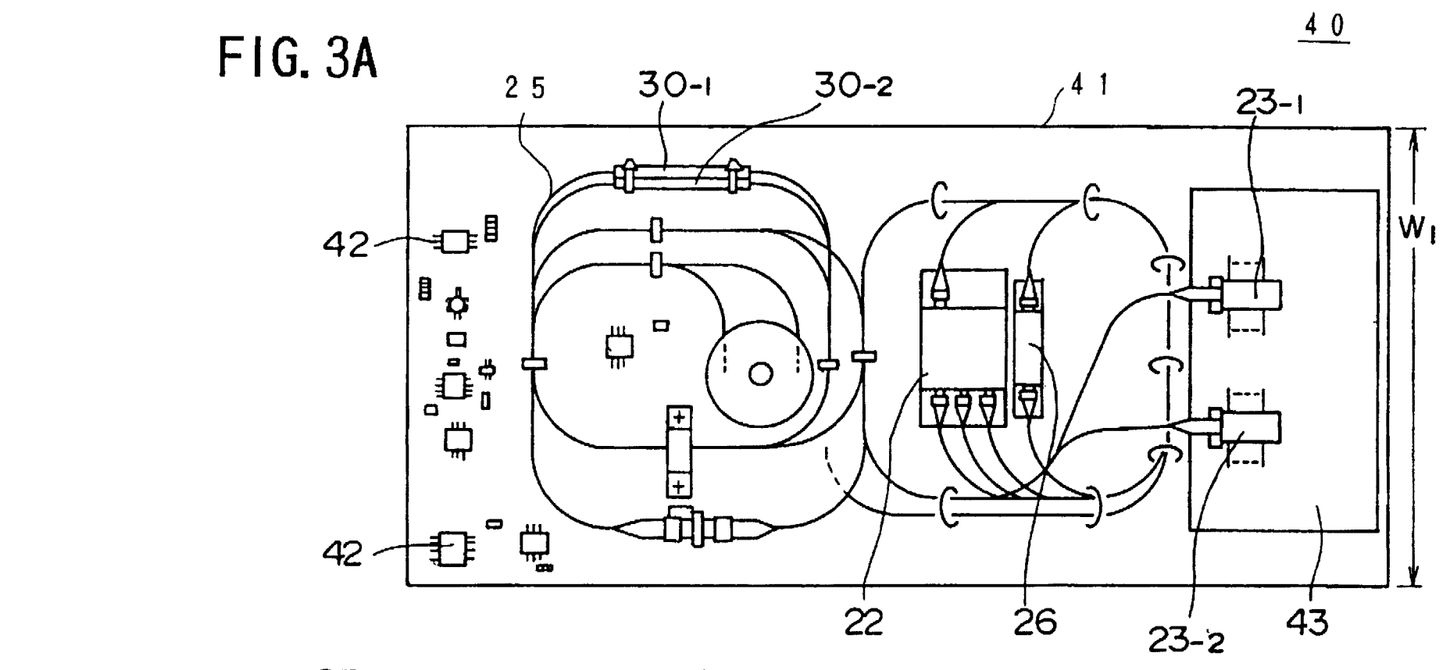
FIG. 3A is a plan view of an example of a conventional printed board package used in the optical fiber amplifier shown in FIG. 2.
Figure 3B:
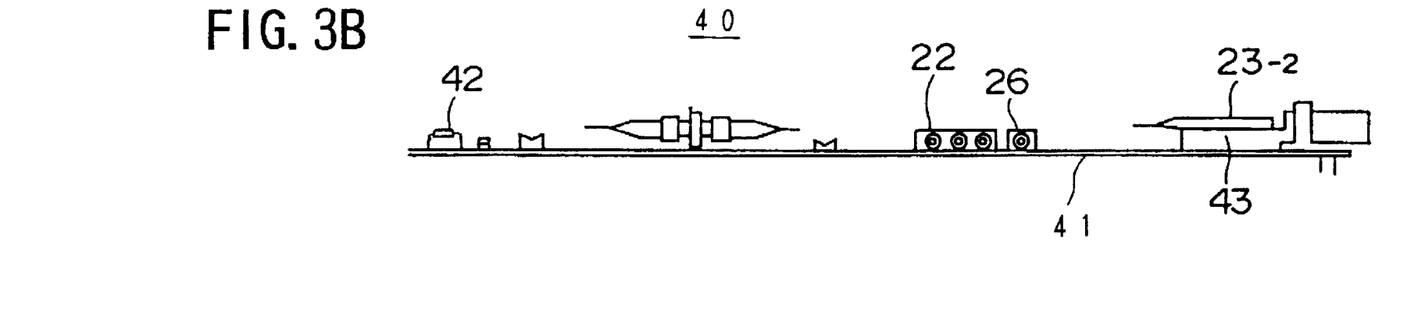
FIG. 3B is a side view of the printed board package shown in FIG. 3A.

FIG. 3A is a plan view of an example of a conventional printed board package 40 used in the optical fiber amplifier 20. FIG. 3B is a side view of the printed board package 40 shown in FIG. 3A. The printed board package 40 comprises a printed board 41 as a mother board. The pre-stage module 22, semiconductor lasers 23-1 and 23-2, the optical isolator 26, the fused splice parts 30-1 and 30-2 and a plurality of electronic parts are mounted over the entire surface of the printed board 41. The optical amplification fiber 25 is provided between the fused splice parts 30-1 and 30-2. The semiconductor lasers 23-1 and 23-2 are mounted on a heat sink plate 43 fixed on the printed board 41. Since a length of the optical amplification fiber 25 is relatively long, a length treatment is applied to the optical amplification fiber 25 so as to confine a play in length into a small space. That is, the optical amplification fiber 25 is treated to form loops spanning over an entire width W of the printed board 41. Accordingly, there is a problem in that the reduction in size of the printed board package 40 is limited by the size of loops formed by the optical amplification fiber 25. Additionally, it is very inconvenient to handle the loops of the optical amplification fiber 25.

SUMMARY OF THE INVENTION

It is a general object of the present invention to provide an improved and useful optical part module and printed board package having such an optical part module in which the above-mentioned problem is eliminated.

A more specific object of the present invention is to provide an optical part module which can accommodate an optical amplification fiber in a small space without being damaged or losing its optical characteristics.

Another object of the present invention is to provide a printed board package having an optical part module mounted on a printed board, the optical part module having an optical amplification fiber in a small space without being damaged or losing its optical characteristics.

Further object of the present invention is to provide a printed board package which can release a heat generated in an optical part module mounted on a printed board.

Yet another object of the present invention is to provide a printed board package having an optical part module shielded from an external noise.

Another object of the present invention is to provide a method for canceling twist generated in an optical fiber when the optical fiber is wound on a bobbin.

In order to achieve the above-mentioned objects, there is provided according to one aspect of the present invention an optical part module comprising:

a case;

a plurality of optical parts provided in the case;

an optical fiber connecting the optical parts, the optical fiber having a predetermined length which creates a large play in length; and a bobbin provided in the case, a part of the optical fiber creating the play in length being wound on the bobbin, the part of the optical fiber being wound while turning the bobbin upside down for each single turn of the winding so that twist generated in the optical fiber due to winding is canceled.

According to the above-mentioned invention, the play in length of the optical fiber is eliminated since the optical fiber is wound on the bobbin in a state where the opposite ends of the optical fiber is fixed. Thus, the length treatment of the play in length of the optical fiber can be performed in a narrow space without excessively twisting the optical fiber. As a result, the size of the optical part module is reduced.

The above-mentioned optical part module may further comprise a bobbin table provided in the case, the bobbin table having a recess receiving the bobbin in a state where a rotation of the bobbin is prevented, a part of the optical fiber being extended outside the bobbin table so as to be connected to other optical parts, the part of the optical fiber passing through a portion of the bobbin table, the portion of the bobbin table having a rounded corner having a radius greater than a predetermined radius determined by the minimum bending radius of the optical fiber. Accordingly, the bobbin can be assembled into the optical part module by an easy assembling operation without bending the optical fiber beyond the allowable minimum radius.

Additionally, the case may be made of metal so that a heat generated in the optical part module is efficiently transmitted to outside the case. The optical part module may further comprise a heat release member releasing heat to atmosphere, the heat release member being mounted on the case. The case may have an opening for air ventilation so that an air stream entering and exiting the case is formed so a to cool parts inside the case.

Additionally, there is provided according to another aspect of the present invention a printed board package comprising:

a) an optical part module comprising:

a case;

a plurality of optical parts provided in the case;

an optical fiber connecting the optical parts, the optical fiber having a predetermined length which creates a large play in length; and a bobbin provided in the case, a part of the optical fiber creating the play in length being wound on the bobbin, the part of the optical fiber being wound while turning the bobbin upside down for each single turn of the winding so that twist generated in the optical fiber due to winding is canceled; and b) a printed board for mounting electronic parts, the optical part module being mounted on the printed board.

According to this invention, the size of the printed board package is reduced since the size of the optical part module, which is a major part of the printed board package, is reduced.

The optical part module may be mounted on the printed board with a space formed therebetween so as to allow for an air passing through between the printed board and the optical part module. This provide an efficient cooling effect to the printed board package. Additionally, the printed board may have a first surface and a second surface opposite to the first surface, the optical part module being mounted on the first surface, the electronic parts being mounted on the second surface. This results in isolation of the optical part module from the electronic parts which may generate an electromagnetic noise. Thus, an efficient shielding effect for the optical part module can be provided. Additionally, a ground pattern is provided on the first surface of the printed board, the ground pattern covering substantially the entire first surface.

In the printed board package according to the present invention, a flat cable may be provided for electrically connecting the optical part module to the printed board, the flat cable having a plurality of wiring patterns extending along a longitudinal direction, the wiring patterns including at least a first wiring pattern, a second wiring pattern and a third wiring pattern, the first wiring pattern being positioned between the second wiring pattern and the third wiring pattern, the first wiring pattern having a ground potential, the second pattern being used for transmitting a first signal having a small amplitude, the third wiring pattern being used for transmitting a second signal having an amplitude greater than the amplitude of the second signal. Accordingly, the first signal is interfered by the second signal having a greater amplitude.

The printed board package may further comprises a bobbin table provided in the case, the bobbin table having a recess receiving the bobbin in a state where a rotation of the bobbin is prevented, a part of the optical fiber being extended outside the bobbin table so as to be connected to other optical parts, the part of the optical fiber passing through a portion of the bobbin table, the portion of the bobbin table having a rounded corner having a radius greater than a predetermined radius determined by the minimum bending radius of the optical fiber. Additionally, the case may be made of metal so as to efficiently transmit a heat generated by parts inside the case.

The printed board package may further comprise a heat release member releasing heat to atmosphere, the heat release member being mounted on the case on an opposite side of the printed board. The case may have openings for air ventilation, the openings being provided on side surfaces perpendicular to the printed board. Accordingly, an air stream passing through inside the case of the optical part module is formed which cools the parts provided in the case.

Additionally, there is provided according to another aspect of the present invention a method for canceling twist generated in an optical fiber when the optical fiber is wound on a bobbin, the bobbin having a first surface perpendicular to a center axis of winding and a second surface opposite to the first surface, the method comprising the steps of:

a) winding the optical fiber substantially a single turn on the bobbin while facing the first surface upwardly;

b) turning the bobbin upside down in a first direction so that the second surface faces upwardly;

c) winding a rest of the optical fiber substantially a single turn on the bobbin;

d) turning the bobbin upside down in a second direction opposite to the first direction so that the first surface faces upwardly; and e) repeating the steps a) to d) until a predetermined length of the optical fiber is wound on the bobbin.

Other objects, features and advantages of the present invention will become more apparent from the following detailed description when read conjunction with the accompanying drawings.

DETAILED DESCRIPTION OF THE PREFERRED EMBODIMENT

Figure 4:
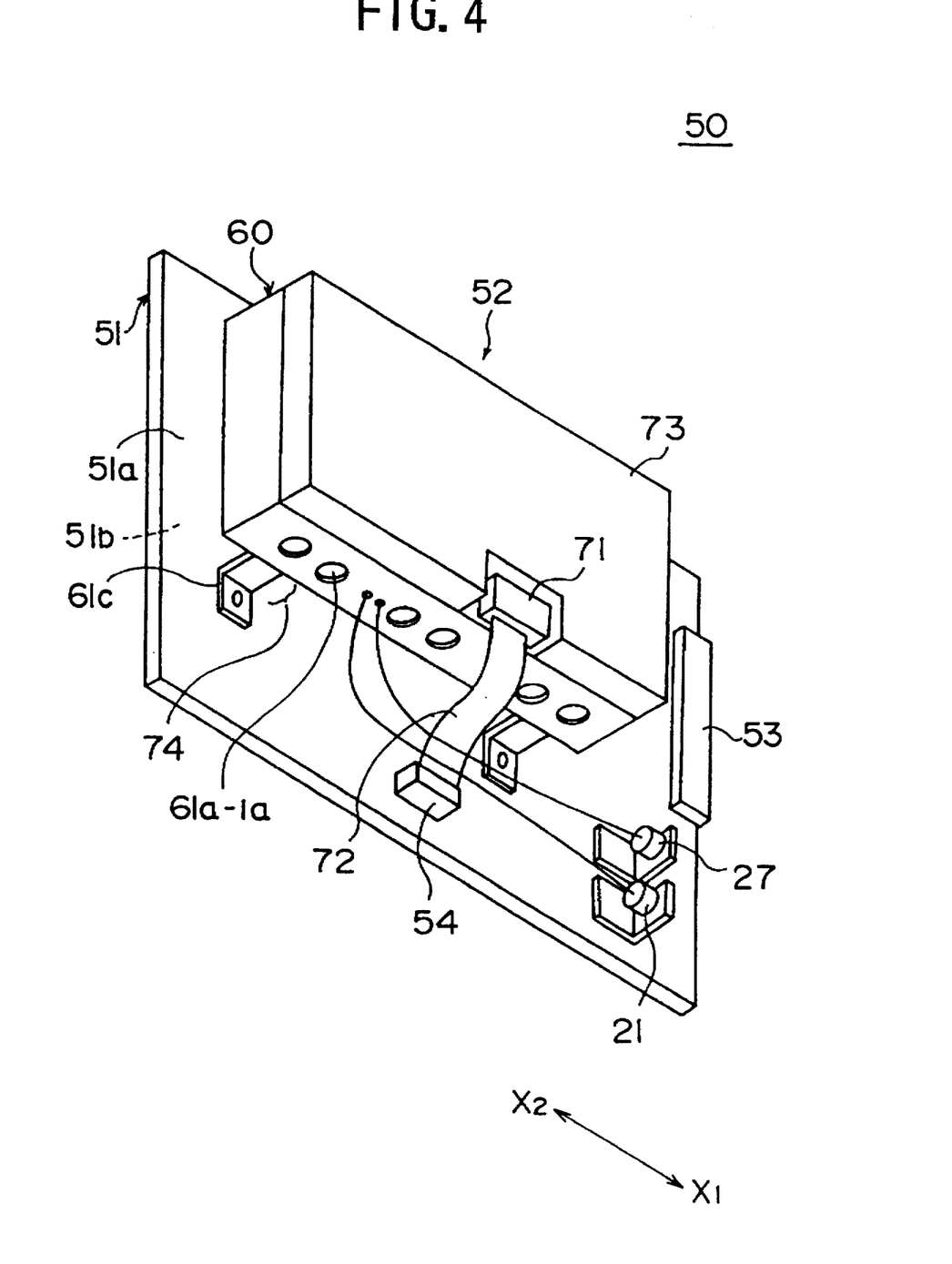
FIG. 4 is a perspective view of a printed board package according to an embodiment of the present invention, viewed from a bottom side.
Figure 5A:
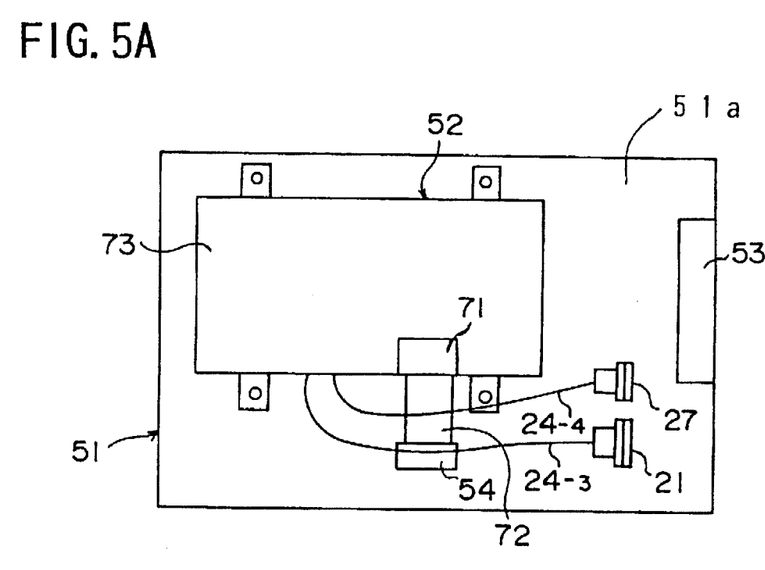
FIG. 5A is a plan view of the printed board package shown in FIG. 4.
Figure 5B:
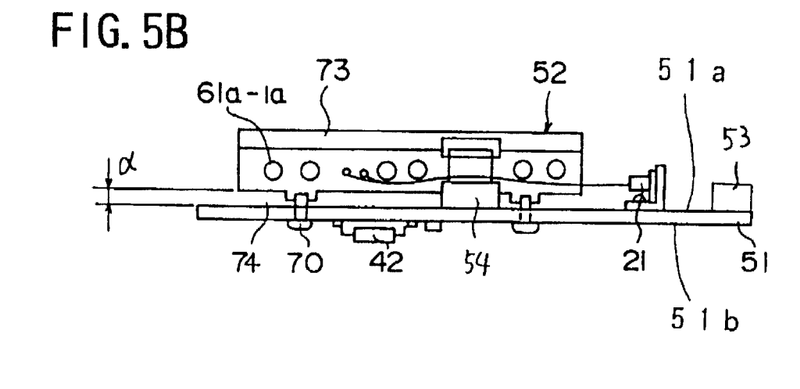
FIG. 5B is a side view of the printed board package shown in FIG. 5A.
Figure 5C:
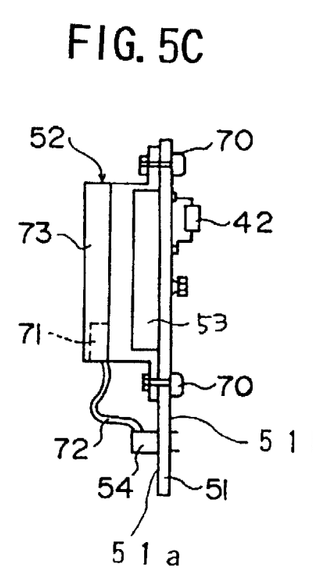
FIG. 5C is a bottom view of the printed board package shown in FIG. 5A.

A description will now be given of an embodiment of the present invention. FIG. 4 is a perspective view of a printed board package 50 according to an embodiment of the present invention, viewed from a bottom side. FIG. 5A is a plan view of the printed board package 50 shown in FIG. 4; FIG. 5B is a side view of the printed board package 50 shown in FIG. 5A; FIG. 5C is a bottom view of the printed board package 50 shown in FIG. 5A. In FIGS. 4, 5A, 5B and 5C, parts that are the same as the parts shown in FIGS. 1 and 2 are given the same reference numerals, and descriptions thereof will be omitted. The printed board package 50 constitutes an optical fiber amplifier like that of the optical communication system 10 shown in FIG. 1.

The printed board package 50 generally comprises printed board 51 as a mother board, an optical part module 52, the optical input terminal 21, the optical output terminal 27, two connectors 53 and 54 and a plurality of electronic parts 42. The printed board 51, the optical part module 52, the optical input terminal 21, the optical output terminal 27 and the connectors 53 and 54 are mounted on a front surface 51a of the printed board 51. The electronic parts 42 are mounted on a reverse surface 51b of the printed board 51.

The optical part module 52 has a structure in which the pre-stage module 22, the semiconductor lasers 23-1 and 23-2 and the optical isolator 26 are housed in a metal case 60 having a rectangular parallelepiped shape. The metal case 60 comprises a case body 61 and a bottom lid 62. The case body 61 comprises a rectangular frame 61a, a top plate 61b and four legs 61c. The legs 61c extends from respective corners of the frame 61a opposite to the top plate 61b. The bottom lid 62 is in the same size as the rectangular frame 61a. The bottom lid 62 has no opening therein. The bottom lid 62 is mounted on the bottom side of the metal case 60 to completely close the bottom of the metal case 60. The bottom lid 62 faces the front surface 51a of the printed board 51 when it is assembled to the printed board 51. Opposite longer side frames 61a-1 and 61a-2 are provided with a plurality of air ventilation openings 61a-1a and 61a-2a, respectively.

Figure 6:
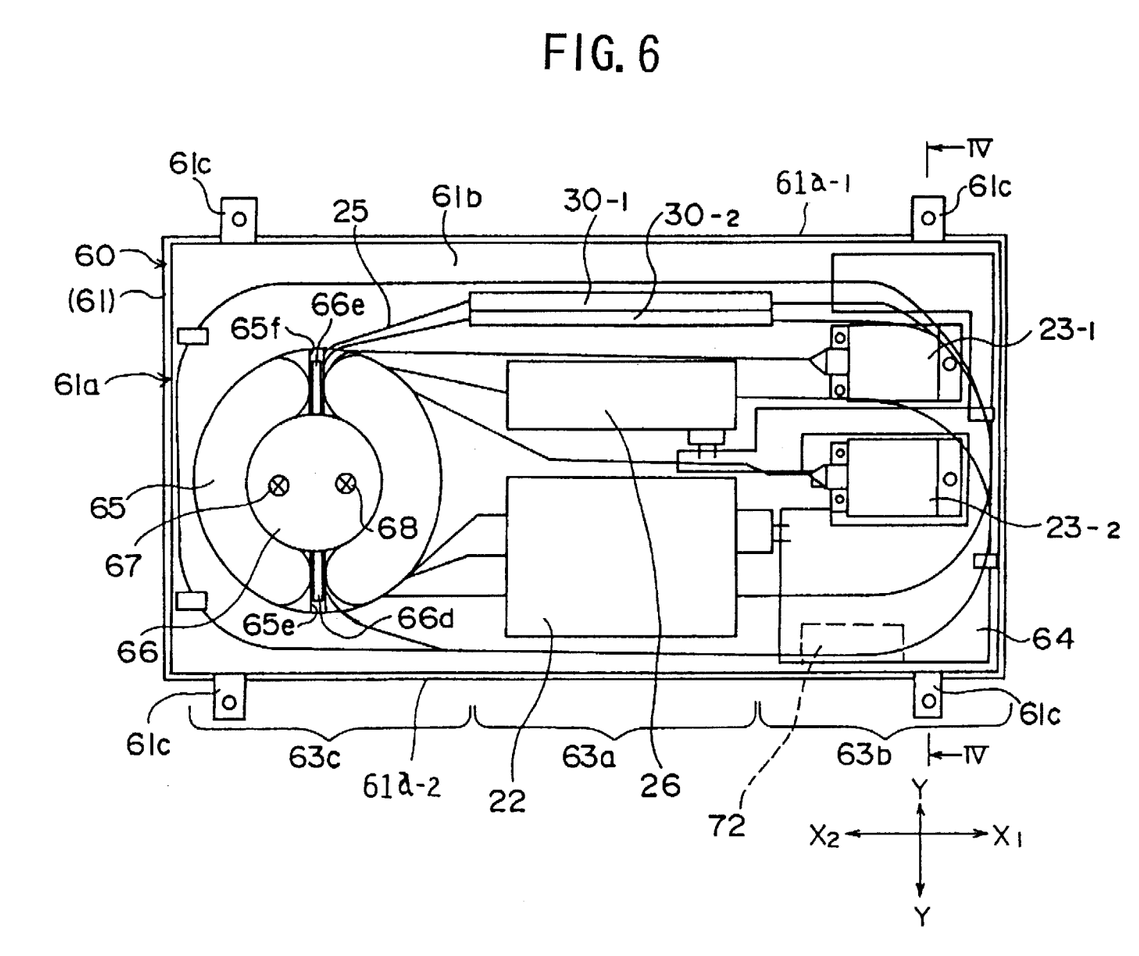
FIG. 6 is a bottom view of the optical part module shown in FIG. 4 with a bottom lid removed therefrom.
Figure 7:
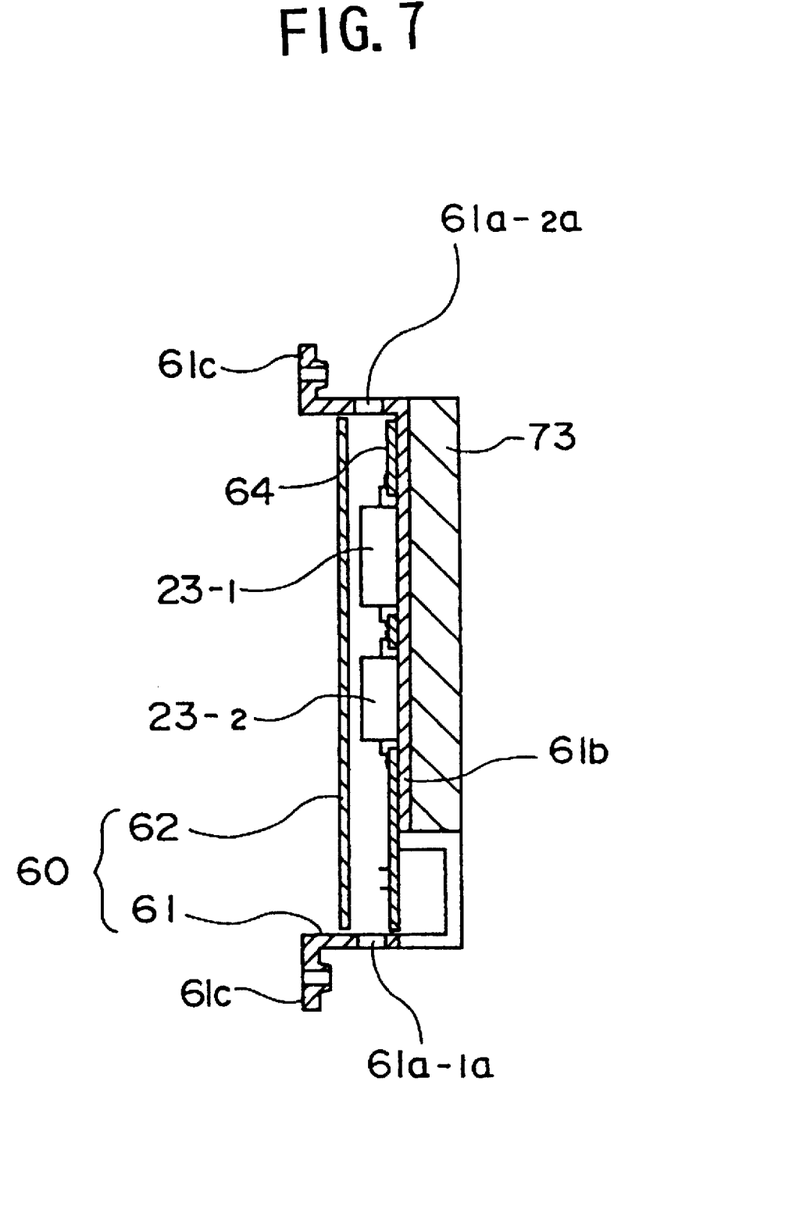
FIG. 7 is a cross-sectional view taken along a line IV—IV of FIG. 6.

The case body 61 has a rectangular shape in a plan view as shown in FIG. 6. The case body 61 comprises a left side portion 63C, a center portion 63a and a right side portion 63b. As shown in FIG. 6, the pre-stage module 22 and the optical isolator 26 are provided in the center portion 63a. The semiconductor lasers 23-1 and 23-2 are provided in the right side portion 63b. The pre-stage module 22, the optical isolator 26 and the semiconductor lasers 23-2 and 23-2 are mounted on an inner surface of the top plate 61b. The fused splice parts 30-1 and 30-2 are also mounted on the inner surface of the top plate 61b in the center portion 63a.

A generally E-shaped small printed board 64 is provided in the right side portion 63b of the case body 61. The semiconductor lasers 23-1 and 23-2, the pre-stage module 22 and the optical isolator 26 are electrically connected to the small printed board 64. Additionally, a connector 71 are mounted on a reverse side of the small printed board 64 when viewed from the bottom side of the case body 61. As shown in FIG. 4, the connector 71 protrudes from a top surface of the metal case 60 so that a flat cable 72 (will be described later) can be easily connected to the connector 71.

A bobbin table 65 is mounted on the inner surface of the top plate 61b in the left side portion 63c. A bobbin 66 is fixed on the bobbin table 65 by screws 67 and 68. The optical amplification fiber 25 is wound on the bobbin 66 in the manner described later, and is applied with a length treatment. A heat release member such as a heat release block 73 is fixed on an outer surface of the top plate 61b. Heat release fins may be provided, alternatively.

The optical part module 52 as constructed above is fixed on the printed board 51 via the four legs 61c. The legs 61c are placed on the front surface 51a of the printed board 51 and fastened by screws 70. Each of the screws 70 is screwed into a burred portion of the respective leg 70 from the reverse surface 51b of the printed board 51. As shown in FIG. 4, a space 74 is formed between the optical part module 52 and the printed board 51. The distance a between the optical part module 52 and the printed board 51 is equal to or slightly greater than 1 mm. The legs 61c are electrically connected to a grounding pattern 90 (will be described later) shown in FIG. 13. Accordingly, the metal case 60 is rendered to be the ground potential when the printed board package 50 is mounted in the repeater 15.

The connector 71 and a connector 54 on the printed board 51 are connected via the flat cable 72. The optical fibers 24-3 and 24-4 are connected to the optical input terminal 21 and the optical output terminal 27, respectively.

The printed board package 50 is inserted into the repeater 15, for example, with a connector 53 positioned ahead so as to be mounted in a vertical position. The connector 53 is connected to a corresponding connector provided inside the repeater 15 when the printed board package 50 is inserted into the repeater 15. The optical fiber 17-1 is connected to the optical input terminal 21. The optical fiber 17-2 is connected to the optical output terminal 27. The printed board package 50 functions as the optical fiber amplifier 20.

In the printed board package 50, the optical amplification fiber 25 is applied with the length treatment. Thus, the size of the printed board package is one-half as small as the size of the conventional printed board package 40 shown in FIGS. 3A–3C. As a result, the repeater 15 using the printed board package 50 can be miniaturized as compared to the repeater 15 using the conventional printed board package.

A description will now be given of the length treatment of the optical amplification fiber 25. The length treatment is performed by utilizing the bobbin 66.

Figure 8:
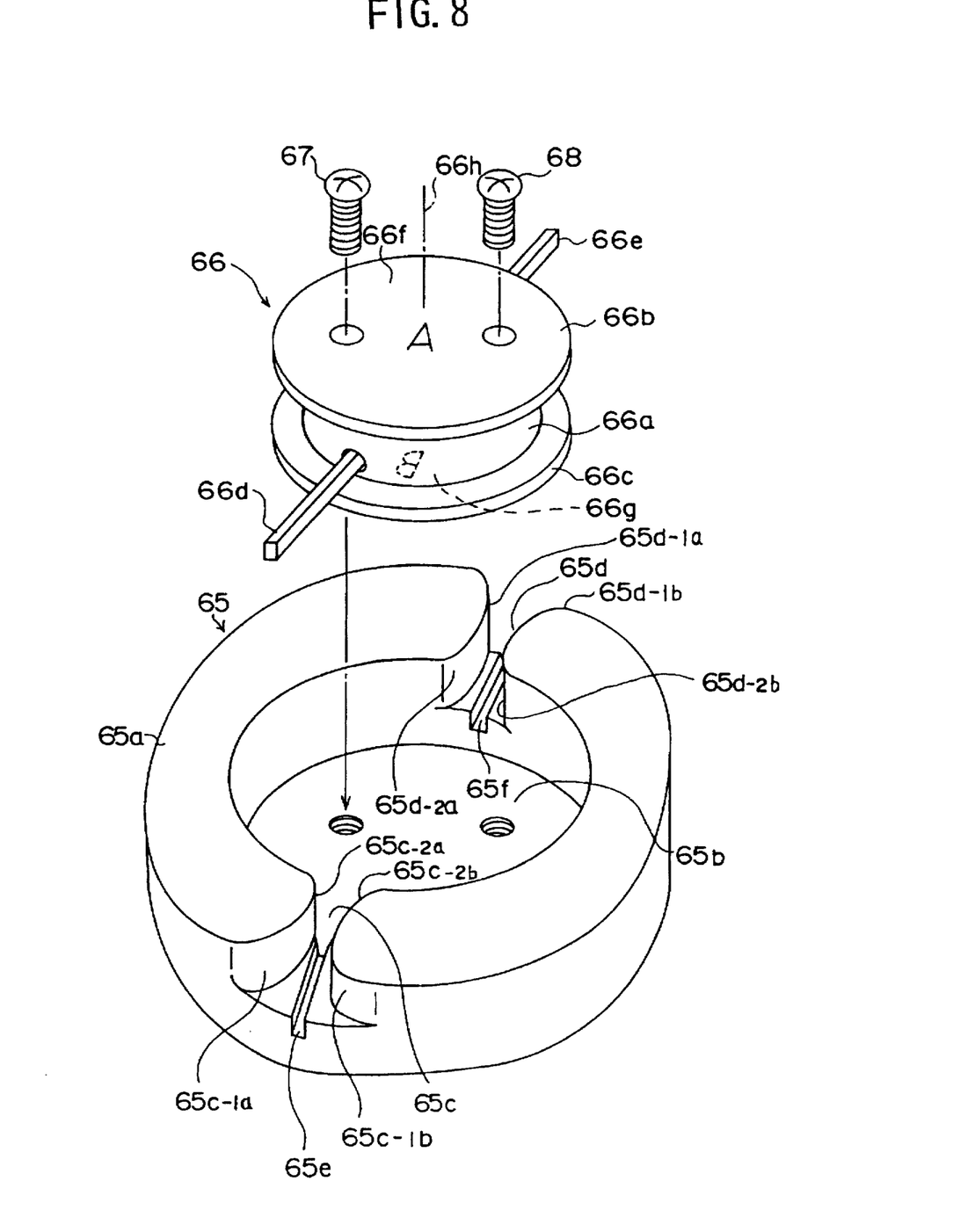
FIG. 8 is an exploded perspective view of the bobbin and the bobbin table shown in FIG. 6.

A description will be given, with reference to FIG. 8, of the construction of the bobbin 66 and the bobbin table 65. The bobbin 66 having a generally cylindrical shape comprises a hub 66a and upper and lower flanges 66b and 66c formed opposite ends of the hub 66a. Rods 66d and 66e having a square cross section extends from the circumferential surface of the hub 66a. The rods 66d and 66e are aligned along a diameter of the hub 66a, and extend toward opposite directions. The radius of the hub 66a is more than thirty times of the diameter of the optical fiber used for the optical amplification fiber 25. A surface 66f of the flange 66b is defined as a surface A, and a surface 66g of the flange 66c is defined as a surface B. This is to distinguish the surfaces A and B from each other.

The bobbin table 65 has a ring-like hollow shape. A recess 65b is formed by a ring-like portion 65a. The recess 65 has substantially the same size as the bobbin 66 so as to receive the bobbin 66 therein. The ring-like portion 65a has grooves 65c and 65d aligned with a diameter of the ring-like portion so that the optical fiber wound on the bobbin 66 can extend from the bobbin table 65 when the bobbin 66 is fitted in the recess 65b of the bobbin table 65. The grooves 65c and 65d have slots 65d and 65e, respectively, on the bottom surfaces thereof so that the slots 65e and 65d receive the respective rods 66d and 66e of the bobbin 65 when the bobbin 66 is fitted in the recess 65b of the bobbin table 65. The corners 65c-1a, 65c-2a, 65c-1b and 65c-2b of the groove 65c are rounded with a radius of more than thirty times of the diameter of the optical fiber used for the optical amplification fiber 25. The corners 65d-1a, 65d-2a, 65d-1b and 65d-2b of the groove 65d are rounded with a radius of more than thirty times of the diameter of the optical fiber used for the optical amplification fiber 25.

Figure 9A:
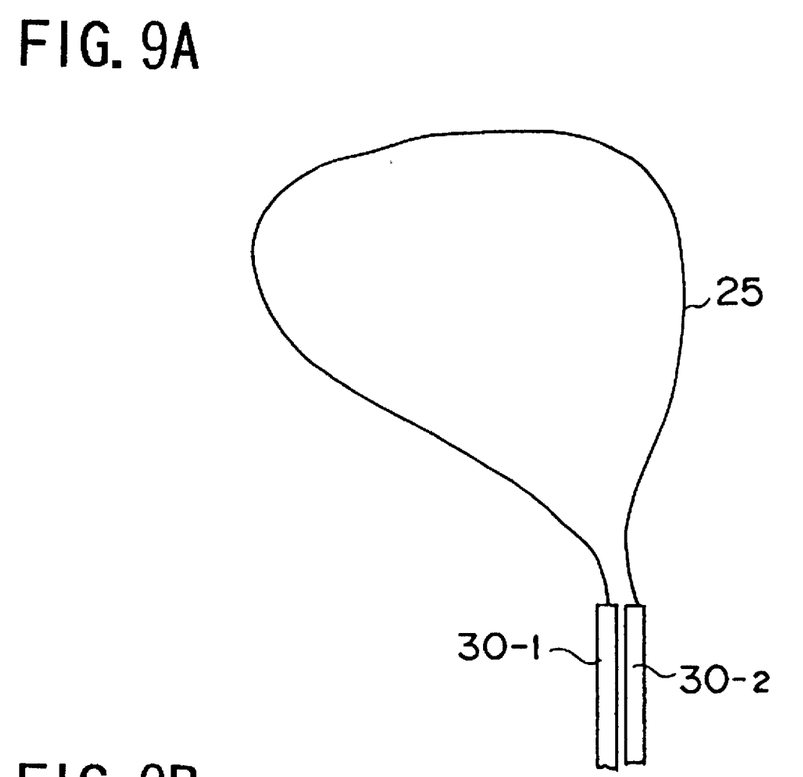
FIG. 9A Is an illustration of an optical amplification fiber before wound on a bobbin shown in FIG. 8.

The length treatment of the optical amplification fiber 25 is performed as shown in FIGS. 9A, 9B, 10A–10C and 11A–11C. That is, as shown in FIG. 9A, the optical amplification fiber 25 having a length sufficient for amplification is prepared so that the fiber has not twist. The opposite ends of the optical amplification fiber 25 are connected to the respective optical fibers 24-1 and 24-2 via the fused splice parts 30-1 and 30-2 therebetween. The fused splice parts 30-1 and 30-2 are then mounted at predetermined positions on the inner surface of the top plate 61b of the case body 61 as shown in FIG. 6 so that there is no twist in the optical amplification fiber 25.

Figure 9B:
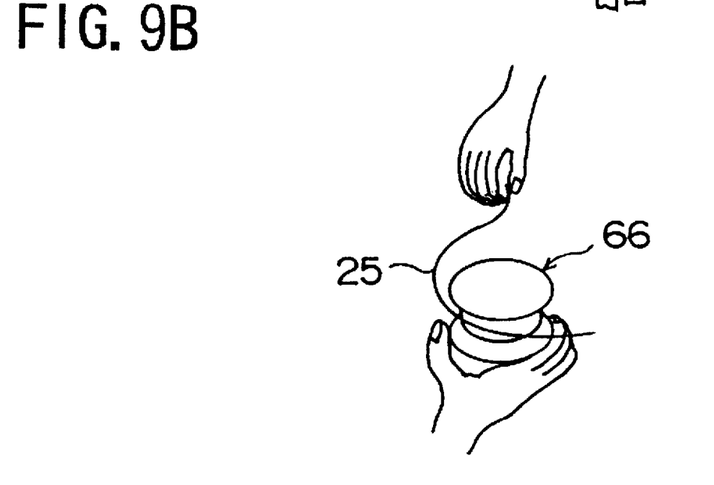
FIG. 9B is an illustration for explaining a winding operation of the optical amplification fiber shown in FIG. 9A.

Thereafter, the optical amplification fiber 25 is wound on the bobbin 66 starting from the portion close to the fused splice part 30-1 as shown in FIG. 9B. The winding operation of the optical amplification fiber 25 on the bobbin 66 is performed sequentially as shown in FIGS. 10A–10C and 11A–11C. In FIGS. 10A–10C and 11A–11C, the bobbin 66 is diagrammatically illustrated, and the views on the left side are perspective views and the views on the right side are plan views.

Figure 10A:
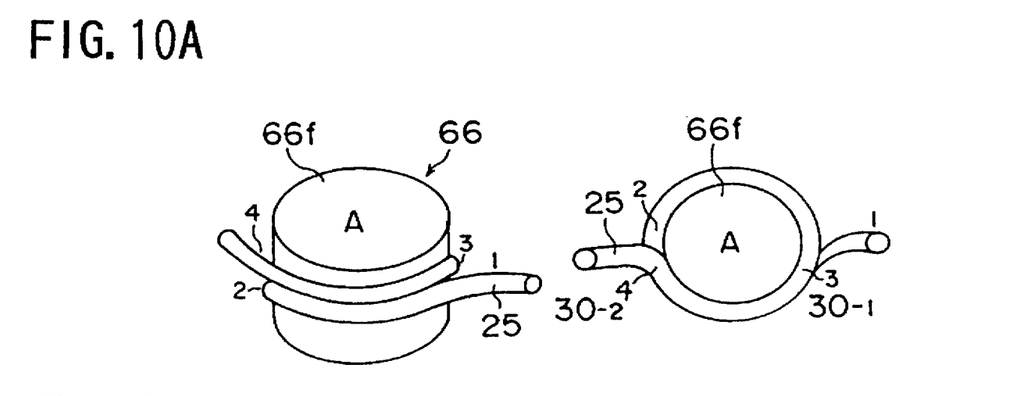
FIGS. 10A, 10B and 10C are illustrations for explaining the winding operation of the optical amplification fiber on the bobbin shown in FIG. 8.
Figure 10B:
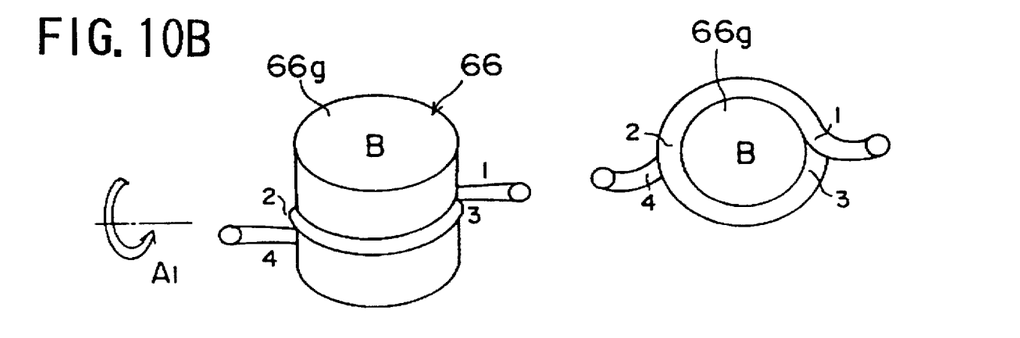
Figure 10C:
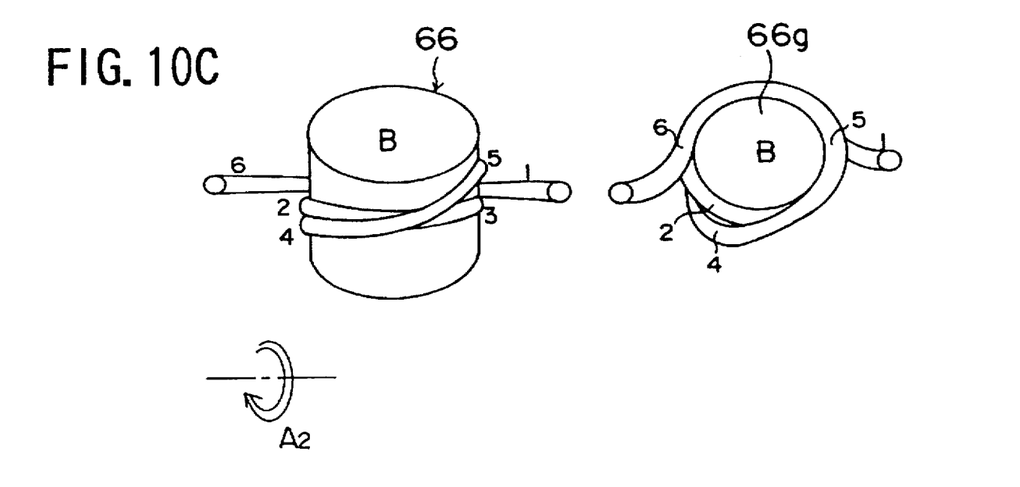
Figure 11A:
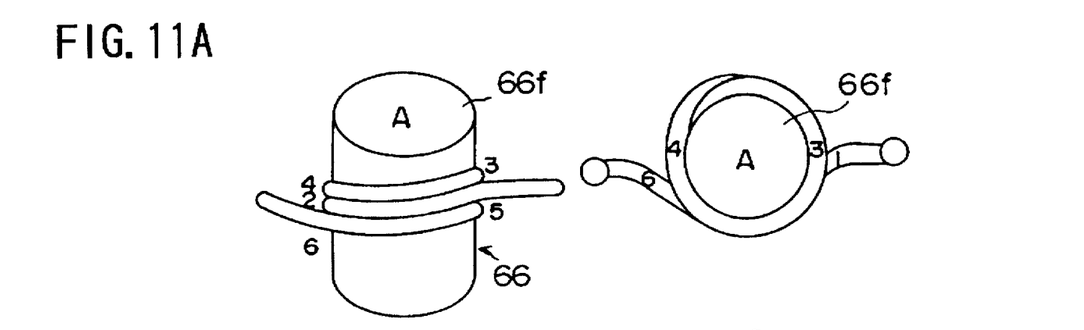
FIGS. 11A, 11B and 11C are illustrations for explaining the winding operation of the optical amplification fiber on the bobbin shown in FIG. 8.
Figure 11B:
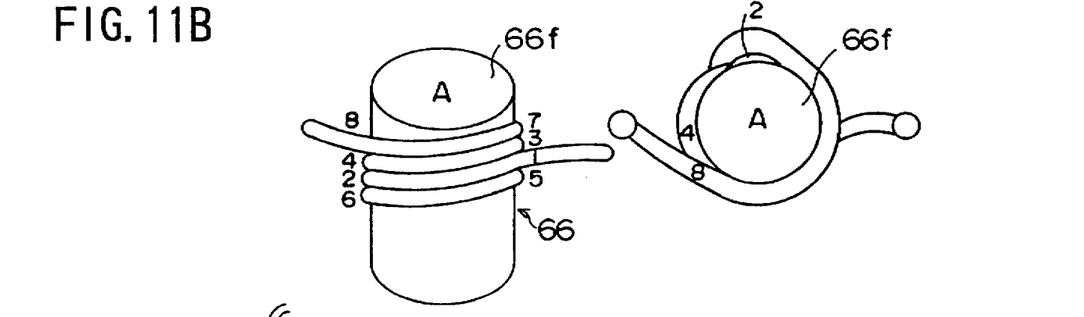
Figure 11C:
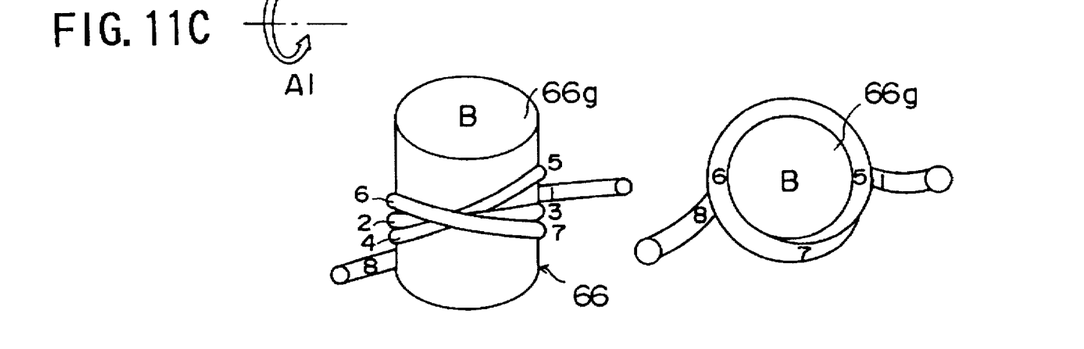

As shown in FIG. 10A, the optical amplification fiber 25 is wound about 360 degrees on the bobbin 66 which is supported as the surface 66f (surface A) facing upward. Then, as shown in FIG. 10B, the bobbin 66 is turned upside down about the rods 66d and 66e in the direction indicated by an arrow A1 in FIG. 10B. Accordingly, the surface 66g (surface B) then faces upward. The optical amplification fiber 25 is then wound about 360 degrees on the bobbin 66 as shown in FIG. 10C. The direction of winding at this time is opposite to the direction of winding at the previous winding operation shown in FIG. 10A. Thereafter, the bobbin 66 is turned upside again about the rods 66e and 66d in the direction indicated by an arrow A2 in FIG. 10C so that the surface A faces upward as shown in FIG. 11A. The rest of the optical amplification fiber 25 is wound about 360 degrees as shown in FIG. 11B. Then the bobbin 66 is turned upside down in the direction A1 so that the surface B faces upward again as shown in FIG. 11C. The rest of the optical amplification fiber 25 is wound about 360 degrees on the bobbin 66. The above-mentioned winding operation is repeated until the undesired play in the length of the optical amplification fiber 25 is eliminated. It should be noted that the numbers 1-8 shown in FIGS. 10A–10C and 11A–11C indicate the same points on the optical amplification fiber 25 which have been wound on the bobbin 66.

In the above-mentioned winding operation, the bobbin 66 is turned upside down in the predetermined direction between each 360-degree windings of the optical amplification fiber 25. This is to cancel the twist of 180 degrees generated in the optical amplification fiber 25 between the bobbin 66 and the fused splice part 30-2 for each 360-degree winding. Since the bobbin 66 is turned upside down in opposite directions, that is, the bobbin 66 is turned as it swings, the optical amplification fiber between the bobbin 66 and the fused splice part 30-1 is not twisted more than 180 degrees as the winding operation for 360 degrees is repeated many times.

Finally, the bobbin 66 having the optical amplification fiber 25 wound thereon is inserted into the recess 65b so that the rods 66d and 66e fit in the respective slots 65d and 65f. In this state, the opposite ends of the optical amplification fiber 25 extending from the bobbin 66 are lead to the outside of the bobbin table 65 through the respective grooves 65c and 65e. The bobbin is then fixed to the bobbin table 65 by screws 67 and 68. In this construction, the bobbin 66 is appropriately positioned by the rods 66d and 66e being fitted in the slots 65d and 65e. Additionally, the bobbin 66 is prevented from being rotated about the center axis 66h when assembling the bobbin 66 to the bobbin table 65. Thus assembling operation of the bobbin 66 is easy.

As discussed above, since only little twist is generated in the optical amplification fiber 25 during the winding operation, the optical amplification fiber 25 is prevented from being damaged due to the twist. Additionally, after the length treatment is performed, there is not twist stress generated in the optical amplification fiber 25. Thus, the characteristics of the optical amplification fiber 25 is not deteriorated. Accordingly, the printed board package 50 can perform a normal amplifying operation as desired.

In order to cancel the twist generated in a 360-degree winding, it is considered to provide two bobbins so that the optical fiber can be wound on the two bobbins, alternatively, as drawing figure eight (8). In such a construction, a relatively large space is occupied by the two bobbins. However, in the present embodiment, since only one bobbin is provided, the space occupied by the bobbin 66 is about one half of the space in the case where two bobbins are provided. Thus, the optical part module 52 is miniaturized, and thus the size of the printed board package 50 is reduced.

Additionally, since each corner of the grooves 65c and 65d of the bobbin table 65 is rounded with the radius of more than thirty times of the diameter of the optical fiber used for the optical amplification fiber 25, the parts of the optical amplification fiber extending from the bobbin 66 are not subjected to be bent sharply. Accordingly, an excessive bending stress is not generated in the optical amplification fiber 25. This also prevent the optical amplification fiber 25 from being damaged due to sharp bending.

A description will now be given of other features of the optical part module 52 and the printed board package 50.

One of the features of the optical part module 52 and the printed board package 50 is efficient release of heat generated by the parts provided in the optical part module. The efficient heat release can be achieved by the following constructions.

1) The semiconductor lasers 23-1 and 23-2 are mounted in contact with the inner surface of the top plate 61b of the case body 61. The heat release block 69 is fixed on the top plate 61b in a state where the heat release block 69 is in contact with an entire surface of the top plate 69.

2) A plurality of air ventilation openings 61a-1a and 61a-2a are formed in the longer side frames 61a-1 and 61a-2, respectively.

3) The metal case 60 is lifted apart from the surface of the printed board 51. That is, the space 74 is formed between the metal case 60 and the printed board 51.

Figure 12:
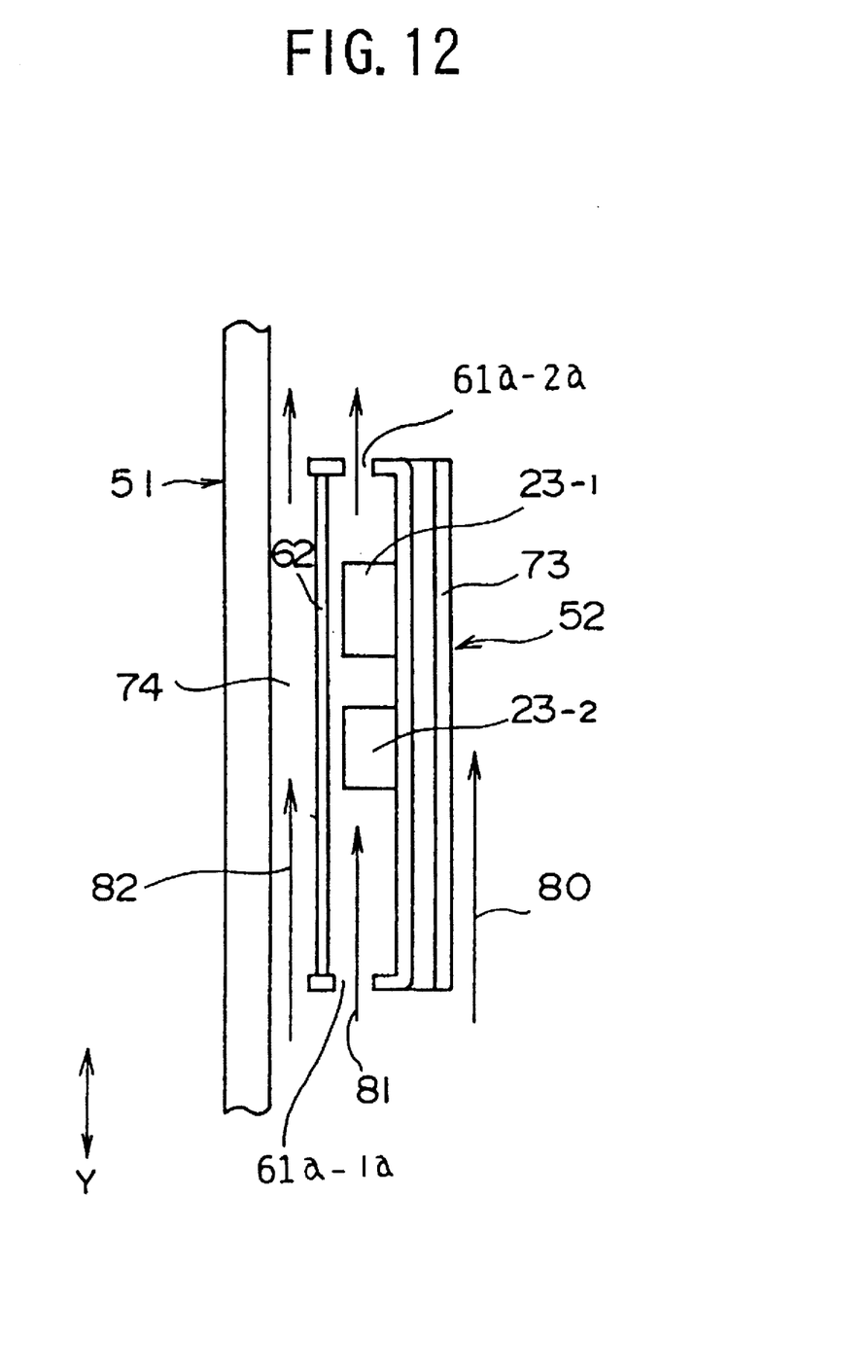
FIG. 12 is an illustration for explaining air streams around the optical part module when the printed board package is provided in a repeater.

According to the above-mentioned constructions, as shown in FIG. in a heat generated by the semiconductor lasers 23-1 and 23-2 is firstly transmitted to the heat release block 69 via the top plate 61b, and the heat spread over the entire heat release block 69. The heat is released to the upward air stream 80 along the heat release block 60. Secondly, the heat generated by the semiconductor lasers 23-1 and 23-2 is directly released to the upward air stream 81 entering the case 60 through the air ventilation openings 61a-1a and exiting from the air ventilation openings 61a-2a. Thirdly, the heat is transmitted to the bottom lid 62 of the metal case 60, and then released to the upward air stream 82 in the space 74. Accordingly, the optical part module 52 is efficiently cooled by natural air ventilation around the printed board package 50.

Additionally, the space 74 between the case 60 and the printed board functions as an insulation layer to prevent transmission of heat generated by electronic parts 42 mounted on the reverse surface of the printed board 51. This further reduces a rise in the temperature of the optical part module 52.

As discussed above, the heat generated in the printed board package 50 is efficiently released. Accordingly, the normal operation of the optical part module 52 is ensured even though the size of the optical part module is reduced which condition normally causes a high temperature of the optical part module 52.

Another feature of the optical part module 52 and the printed board package 50 is a shielding effect against a noise generated by the electronic parts 42. The shielding effect is achieved by the following constructions.

4) The semiconductor laser 23-1 and 23-2 are housed in the metal case 60. The metal case 60 is grounded when the printed board package 50 is mounted in the repeater 15.

5) The electronic parts 42 are mounted on the reverse surface 51b of the printed board 51. The reverse surface 51b is opposite to the front surface 51 on which the optical part module 52 is mounted.

Figure 13:
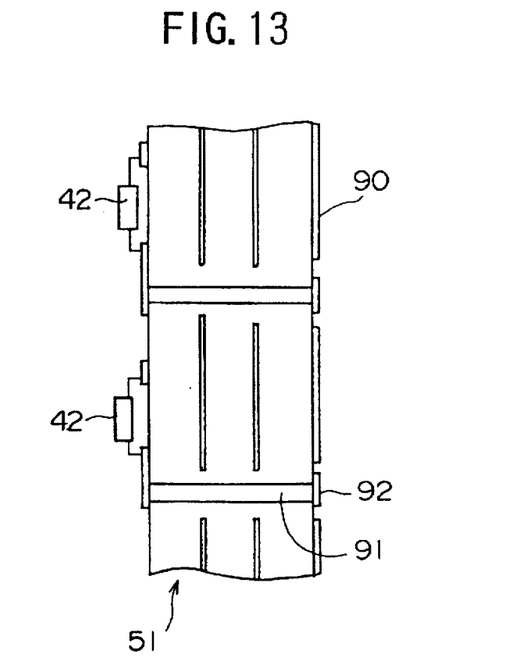
FIG. 13 is a cross-sectional view of a part of the printed board shown in FIG. 4.

6) The printed board 51 is covered with the wide ground pattern 90 on the front surface 51a, as shown in FIG. 13, except for the area provided with a land 92 of a through hole 91 which is provided for a signal path.

7) The side of the case body 61 of the optical part module 52, which side faces the printed board 51, is completely closed by the bottom lid 62.

According to the constructions of 4)-7), an electromagnetic noise generated by the electronic parts 42 hardly reaches the optical part module 52. Additionally, since the metal case 60 functions as a shield case, the electromagnetic noise rarely enters into the optical part module 52.

Due to the reduction in size, a distance between the electronic parts 42 and the optical part module 52 is reduced. Thus, the semiconductor lasers 23-1 and 23-2 provided in the optical part module 52 is easily influenced by the electromagnetic noise generated by the electronic parts 42. However, in the present embodiment, the parts inside the case 60 of the optical part module 52 is hardly influenced by the electromagnetic noise generated by the electronic parts as well as noise from outside according to the above-mentioned constructions. Thus the optical part module 52 according to the present embodiment can be normally operated although the size of the optical part module is considerably reduced.

Further feature of the optical part module 52 and the printed board package 50 is a prevention of interference of signals. The prevention of interference of signals is achieved by the following constructions.

Figure 14:
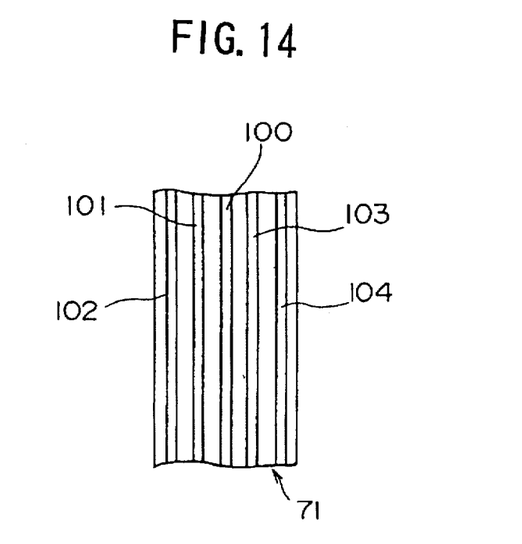
FIG. 14 is a plan view of a flat cable shown in FIG. 4.

8) The flat cable electrically connecting the optical part module 52 to the printed board 51 has the signal assignment of the each wiring pattern as shown in FIG. 14. A wiring pattern 100 having the ground potential is positioned in the center. Wiring patterns 101 and 102 used for transmitting signals having a small amplitude, for example, a signal for monitoring, are provided on the left side of the center wiring pattern 100. Wiring patterns 103 and 104 used for transmitting signals having a relatively large amplitude, for example, a TTL signal or an ECL signal, are provided on the right side of the center wiring pattern 100. That is, the wiring patterns 101 and 102 for a small amplitude signal is separated from the wiring patterns 104 and 105 for a relatively large amplitude signal by the center wiring pattern 100 which is grounded.

According to the above-mentioned construction, the interference between the small amplitude signal such as a monitor signal and the relatively large amplitude signal such as a TTL signal or an ECL signal is prevented.

The present invention is not limited to the specifically disclosed embodiments, and variations and modifications may be made without departing from the scope of the present invention.

What is claimed is:

1. An optical part module comprising:

a case;

a plurality of optical parts provided in said case;

an optical fiber connecting said optical parts, said optical fiber having a predetermined length which creates a large play in length; and a bobbin provided in said case, a part of said optical fiber creating said play in length being wound on said bobbin, said part of said optical fiber being wound while turning said bobbin upside down for each single turn of the winding so that twist generated in said optical fiber due to winding is canceled.

2. The optical part module as claimed in claim 1, further comprising a bobbin table provided in said case, said bobbin table having a recess receiving said bobbin in a state where a rotation of said bobbin is prevented, a part of said optical fiber being extended outside said bobbin table so as to be connected to other optical parts, said part of said optical fiber passing through a portion of said bobbin table, said portion of said bobbin table having a rounded corner having a radius greater than a predetermined radius determined by the minimum bending radius of said optical fiber.

3. The optical part module as claimed in claim 1, wherein said case is made of metal.

4. The optical part module as claimed in claim 3, further comprising a heat release member releasing heat to atmosphere, said heat release member being mounted on said case.

5. The optical part module as claimed in claim 1, wherein said case has an opening for air ventilation.

6. A printed board package comprising:

a) an optical part module comprising:

a case;

a plurality of optical parts provided in said case;

an optical fiber connecting said optical parts, said optical fiber having a predetermined length which creates a large play in length; and a bobbin provided in said case, a part of said optical fiber creating said play in length being wound on said bobbin, said part of said optical fiber being wound while turning said bobbin upside down for each single turn of the winding so that twist generated in said optical fiber due to winding is canceled; and b) a printed board for mounting electronic parts, said optical part module being mounted on said printed board.

7. The printed board package as claimed in claim 6, wherein said optical part module is mounted on said printed board with a space formed therebetween.

8. The printed board package as claimed in claim 6, wherein said printed board has a first surface and a second surface opposite to said first surface, said optical part module being mounted on said first surface, said electronic parts being mounted on said second surface.

9. The printed board package as claimed in claim 8, wherein a ground pattern is provided on said first surface of said printed board, said ground pattern covering substantially the entire first surface.

10. The printed board package as claimed in claim 6, further comprising a flat cable electrically connecting said optical part module to said printed board, said flat cable having a plurality of wiring patterns extending along a longitudinal direction, said wiring patterns including at least a first wiring pattern, a second wiring pattern and a third wiring pattern, said first wiring pattern being positioned between said second wiring pattern and said third wiring pattern, said first wiring pattern having a ground potential, said second pattern being used for transmitting a first signal having a small amplitude, said third wiring pattern being used for transmitting a second signal having an amplitude greater than the amplitude of said second signal.

11. The printed board package as claimed in claim 6, further comprising a bobbin table provided in said case, said bobbin table having a recess receiving said bobbin in a state where a rotation of said bobbin is prevented, a part of said optical fiber being extended outside said bobbin table so as to be connected to other optical parts, said part of said optical fiber passing through a portion of said bobbin table, said portion of said bobbin table having a rounded corner having a radius greater than a predetermined radius determined by the minimum bending radius of said optical fiber.

12. The printed board package as claimed in claim 6, wherein said case is made of metal.

13. The printed board package as claimed in claim 12, further comprising a heat release member releasing heat to atmosphere, said heat release member being mounted on said case on an opposite side of said printed board.

14. The printed board package as claimed in claim 6, wherein said case has openings for air ventilation, said openings being provided on side surfaces perpendicular to said printed board.

15. A method for canceling twist generated in an optical fiber when said optical fiber is wound on a bobbin, said bobbin having a first surface perpendicular to a center axis of winding and a second surface opposite to said first surface, said method comprising the steps of:

a) winding said optical fiber substantially a single turn on said bobbin while facing said first surface upwardly;

b) turning said bobbin upside down in a first direction so that said second surface faces upwardly;

c) winding a rest of said optical fiber substantially a single turn on said bobbin;

d) turning said bobbin upside down in a second direction opposite to said first direction so that said first surface faces upwardly; and e) repeating the step a) to d) until a predetermined length of said optical fiber is wound on said bobbin.

* * * * *